United States Patent
Abe et al.

(10) Patent No.: US 10,865,313 B2
(45) Date of Patent: Dec. 15, 2020

(54) RESIN EMULSION FOR DAMPING PAINT, DAMPING PAINT, AND METHOD FOR PRODUCING RESIN EMULSION FOR DAMPING PAINT

(71) Applicant: SAIDEN CHEMICAL INDUSTRY CO., LTD., Tokyo (JP)

(72) Inventors: Koji Abe, Saitama (JP); Kenichiro Ishimoto, Saitama (JP)

(73) Assignee: Saiden Chemical Industry Co., Ltd., Chuo-Ku (JP)

(*) Notice: Subject to any disclaimer, the term of this patent is extended or adjusted under 35 U.S.C. 154(b) by 0 days.

(21) Appl. No.: 16/488,660

(22) PCT Filed: Jan. 15, 2019

(86) PCT No.: PCT/JP2019/000871
§ 371 (c)(1),
(2) Date: Aug. 26, 2019

(87) PCT Pub. No.: WO2019/142766
PCT Pub. Date: Jul. 25, 2019

(65) Prior Publication Data
US 2020/0048473 A1 Feb. 13, 2020

(30) Foreign Application Priority Data
Jan. 17, 2018 (JP) ................. 2018-005373

(51) Int. Cl.
| | | |
|---|---|---|
| C09D 5/02 | (2006.01) |
| C08K 3/013 | (2018.01) |
| C08F 2/22 | (2006.01) |
| C08F 2/44 | (2006.01) |
| C08K 7/22 | (2006.01) |
| C09D 133/12 | (2006.01) |

(52) U.S. Cl.
CPC ............ C09D 5/02 (2013.01); C08F 2/22 (2013.01); C08F 2/44 (2013.01); C08K 3/013 (2018.01); C08K 7/22 (2013.01); C09D 133/12 (2013.01)

(58) Field of Classification Search
CPC .................................................. C09D 5/02
See application file for complete search history.

(56) References Cited

U.S. PATENT DOCUMENTS

| | | | |
|---|---|---|---|
| 5,618,859 A | 4/1997 | Maeyama et al. | |
| 8,013,050 B2 * | 9/2011 | Mestach | C09D 201/06 524/460 |
| 2005/0101697 A1 | 5/2005 | Morihiro et al. | |

FOREIGN PATENT DOCUMENTS

| | | |
|---|---|---|
| CN | 1624015 A | 6/2005 |
| CN | 101348539 A | 1/2009 |
| JP | H07-145331 A1 | 6/1995 |
| JP | H09-111132 A1 | 4/1997 |
| JP | 2000-086939 A1 | 3/2000 |
| JP | 2004-115740 A1 | 4/2004 |
| JP | 2008-133394 A1 | 6/2008 |
| JP | 2011-026528 A1 | 2/2011 |
| JP | 2011-140623 A1 | 7/2011 |
| JP | 2015-054883 A1 | 3/2015 |
| JP | 2016-191065 A1 | 11/2016 |

OTHER PUBLICATIONS

International Search Report and Written Opinion (Application No. PCT/JP2019/000871) dated Apr. 2, 2019.
International Preliminary Report on Patentability (Chapter I) (Application No. PCT/JP2019/000871) dated Jul. 21, 2020 (with English translation).

* cited by examiner

*Primary Examiner* — Vickey Nerangis
(74) *Attorney, Agent, or Firm* — Burr & Brown, PLLC

(57) ABSTRACT

Provided is a resin emulsion for a damping paint, the resin emulsion being capable of contributing to formation of a coating film to which swelling and peeling are unlikely to occur and having favorable mechanical stability. The resin emulsion for a damping paint contains a (meth)acrylic resin particle including a particle obtained by polymerizing a monomer component containing 50% by mass or more of a (meth)acrylic acid ester and an adsorbed protective layer obtained by allowing a polycarboxylic acid-based polymer compound having a structural unit derived from a carboxylic acid, or a salt or anhydride thereof to be adsorbed onto the surface of the particle. The (meth)acrylic resin particle has a ratio of an average particle diameter $D_A$ by means of a laser diffraction/scattering method to an average particle diameter $D_B$ by means of a dynamic light scattering method, $D_A/D_B$, of less than 1.

8 Claims, No Drawings

RESIN EMULSION FOR DAMPING PAINT, DAMPING PAINT, AND METHOD FOR PRODUCING RESIN EMULSION FOR DAMPING PAINT

TECHNICAL FIELD

The present invention relates to a resin emulsion for a damping paint, a damping paint, and a method for producing a resin emulsion for a damping paint.

BACKGROUND ART

A damping material is provided in a vehicle floor and of automobiles, and the like in order to prevent vibration. As the damping material, a sheet-like damping material containing asphalt as a main component, and a damping material (damping paint) in the form of a paint are used. In the case of the sheet-like damping material, a worker needs to cut the sheet-like damping material so as to match the shape of the position where the sheet-like damping material is to be provided and then install the sheet-like damping material.

On the other hand, the damping paint is easily utilized irrespective of the shape of the position where the damping material is to be provided because the damping material can be formed by means of a coating film through coating, and automation by means of robot coating can be performed, so that it can be said that the damping paint is advantageous in terms of productivity, workability, and the like. Among the damping paints, a damping paint using an aqueous resin emulsion has advantages that a working environment in forming a coating film (damping material) is favorable and that environmental load is small, and therefore various proposals have so far been made (see, for example, Patent Literatures 1 to 4).

Patent Literature 1 discloses an aqueous damping paint being a baking type aqueous paint using a resin emulsion, the aqueous damping paint containing 0.1% by mass or more and less than 5% by mass of a heat expansion type organic hollow filler or organic foaming agent. Patent Literature 2 discloses an aqueous damping material containing an aqueous resin emulsion, a predetermined heat-curable resin, and a heat-foaming agent each in a predetermined ratio. Patent Literature 3 discloses an aqueous damping paint composition containing a resin emulsion as a main component, wherein a fusion bond retardant that retards fusion among the resin emulsions during drying is blended. Patent Literature 4 discloses an aqueous resin composition to be used for imparting damping properties, the aqueous resin composition containing at least: a polymer synthetic resin emulsion; and a hollow particle made of a resin having a glass transition temperature (Tg) of 40 to 140° C.

CITATION LIST

Patent Literature

Patent Literature 1: Japanese Patent Laid-Open No. 7-145331
Patent Literature 2: Japanese Patent Laid-Open No. 2004-115740
Patent Literature 3: Japanese Patent Laid-Open No. 2011-140623
Patent Literature 4: Japanese Patent Laid-Open No. 2015-054883

SUMMARY OF INVENTION

Technical Problem

A damping material using a conventional resin emulsion, when applied and dried to form a coating film, is liable to cause coating film defects such as swelling and peeling to occur. If the defects such as swelling and peeling occur to the formed coating film (damping material), the damping performance of the damping material is impaired, and in the case where a worker touches the damping material, or the damping material is subjected to contact, shock, or the like when another part is attached to the damping material, breakage or peeling of the damping material is liable to occur.

In addition, in a damping paint using a conventional resin emulsion, there is a tendency that a coating nozzle is liable to be clogged due to agglomeration of the paint when coating with the damping paint is performed continuously for a long time. If the clogging of the coating nozzle occurs, the nozzle is difficult to wash and coating workability is deteriorated, which may lead to stopping of production lines. It is to be noted that clogging of a coating nozzle is attributable to agglomeration of a paint and can therefore be considered to relate to the mechanical stability of a damping paint and a resin emulsion to be used for the damping paint.

Various damping paints using a resin emulsion have so far been studied, and as disclosed in Patent Literatures 1 to 4, and the like, techniques that enable improvements in coating film defects have been proposed. However, such improvements in coating film defects are often achieved by an additive blended separately from the resin emulsion and have not necessarily been satisfying depending on the use conditions. Therefore, actual circumstances are that there is still room for improvements with respect to coating film defects such as swelling and peeling and clogging of a coating nozzle in damping paints using a resin emulsion.

In consideration of the above-described actual circumstances, the present invention intends to provide a resin emulsion for a damping paint, the resin emulsion being capable of contributing to formation of a coating film to which swelling and peeling are unlikely to occur and having favorable mechanical stability.

Solution to Problem

The present invention provides a resin emulsion for a damping paint, containing a (meth)acrylic resin particle including: a particle obtained by polymerizing a monomer component containing 50% by mass or more of a (meth) acrylic acid ester; and an adsorbed protective layer obtained by allowing a polycarboxylic acid-based polymer compound having a structural unit derived from a carboxylic acid, or a salt or anhydride thereof to be adsorbed onto a surface of the particle, wherein the (meth)acrylic resin particle has a ratio of an average particle diameter $D_A$ by means of a laser diffraction/scattering method to an average particle diameter $D_B$ by means of a dynamic light scattering method, $D_A/D_B$, of less than 1.

Advantageous Effects of Invention

According to the present invention, a resin emulsion for a damping paint, the resin emulsion being capable of contributing to formation of a coating film to which swelling and peeling are unlikely to occur and having favorable mechanical stability, can be provided.

DESCRIPTION OF EMBODIMENTS

Hereinafter, embodiments of the present invention will be described; however, the present invention is not limited to the following embodiments.

<Resin Emulsion for Damping Paint>

A resin emulsion for a damping paint according to one embodiment of the present invention (hereinafter, sometimes simply written as "resin emulsion" or "emulsion") contains a (meth)acrylic resin particle including: a particle obtained by polymerizing a monomer component containing 50% by mass or more of a (meth)acrylic acid ester; and an adsorbed protective layer obtained by allowing a polycarboxylic acid-based polymer compound to be adsorbed onto a surface of the particle. This (meth)acrylic resin particle has a ratio of an average particle diameter $D_A$ by means of a laser diffraction/scattering method to an average particle diameter $D_B$ by means of a dynamic light scattering method, $D_A/D_B$, of less than 1.

It is to be noted that in the present specification, the term "(meth)acrylic" means to include both of the terms "acrylic" and "methacrylic". Similarly, the term "(meth)acrylate" means to include both of the terms "acrylate" and "methacrylate".

In addition, in the present specification, the average particle diameter $D_A$ of the (meth)acrylic resin particle, obtained by a laser diffraction/scattering method, means a particle diameter ($D_{50}$) at which cumulation reaches 50% in the particle size distribution on a volume basis measured by the laser diffraction/scattering method. In the laser diffraction/scattering method, a particle diameter is measured by measuring angular dependence of the intensity of light scattered when laser light passes through a sample of dispersed particles. In the case of a large particle, light is scattered at a small angle relative to the laser light, and in the case of a small particle, light of approximately the same intensity is scattered to a large angle. Data for every angle are analyzed to calculate particle diameters that create diffraction/scattering patterns using the Fraunhofer diffraction theory, the Mie scattering theory, and the like. In this way, the laser diffraction/scattering method is a method of measuring changes in angles of the intensity of light scattered when the laser light passes through a sample of dispersed particles, thereby measuring the particle size distribution, and there is a tendency that a particle diameter of a particle itself is measured because the adsorbed protective layer described above and water-soluble protective colloid transmit laser light.

Further, in the present specification, the average particle diameter $D_B$ of the (meth)acrylic resin particle, obtained by a dynamic light scattering method, means a particle diameter ($D_{50}$) at which cumulation reaches 50% in the particle size distribution on a volume basis measured by dynamic light scattering. When particles in a state of Brownian motion in a solution or suspension are irradiated with laser light, fluctuation occurs in scattered light according to the diffusion coefficient. Motions of large particles are slow, and therefore the fluctuation of the scattered light is slow, but motions of small particles are fast, and therefore the fluctuation of the scattered light changes rapidly. In the dynamic light scattering method, this fluctuation in which the diffusion coefficient is reflected is detected to measure particle diameters utilizing Stokes-Einstein equation and the like. In this way, in the dynamic light scattering method, the fluctuation corresponding to the speeds of Brownian motion of particles is measured, and therefore there is a tendency that a particle diameter including the adsorbed protective layer described above and protective colloid of an emulsifying agent, water-soluble resin, and the like is measured.

The (meth)acrylic resin particle includes an adsorbed protective layer obtained by allowing a polycarboxylic acid-based polymer compound to be adsorbed onto the surface of a particle so that a difference between the average particle diameter $D_A$ by means of a laser diffraction/scattering method and the average particle diameter $D_B$ by means of a dynamic light scattering method (specifically, characteristic of $D_A/D_B$ being less than 1) is seen. Therefore, the resin emulsion containing this (meth)acrylic resin particle has a favorable mechanical stability. By using this resin emulsion, a damping paint which has a favorable mechanical stability and by which a coating film to which swelling and peeling are unlikely to occur can be provided.

$D_A/D_B$, which is a ratio of the average particle diameter $D_A$ to the average particle diameter $D_B$ of the (meth)acrylic resin particle, may be less than 1 (1.00), preferably 0.99 or less, and more preferably 0.98 or less. In addition, the lower limit of $D_A/D_B$ is not particularly limited but is preferably 0.2 or more, more preferably 0.3 or more, and still more preferably 0.35 or more from the viewpoint of producing the (meth)acrylic resin particle.

As described above, as the (meth)acrylic resin particle including an absorbed protective layer obtained by allowing a polycarboxylic acid-based polymer compound to be adsorbed onto the surface of the particle so as to satisfy a relationship that the average particle diameter $D_B$ is larger than the average particle diameter $D_A$, for example, the following (meth)acrylic resin particle can be used. That is, a (meth)acrylic resin particle obtained by polymerizing a monomer component containing 50% by mass or more of a (meth)acrylic acid ester in the presence of 0.1 to 20 parts by mass of a polycarboxylic acid-based polymer compound based on 100 parts by mass of the total amount of the monomer component can suitably be used.

The reason that the (meth)acrylic resin particle obtained by the polymerization in the presence of a particular amount of the polycarboxylic acid-based polymer compound can be a resin particle including an absorbed protective layer obtained by allowing a polycarboxylic acid-based polymer compound to be adsorbed onto the surface of the particle so as to exhibit the characteristic that $D_A/D_B$ is less than 1 is considered to be as follows. In the case of the (meth)acrylic resin particle obtained by the polymerization in the presence of a particular amount of the polycarboxylic acid-based polymer compound, as compared to the method of separately blending the polycarboxylic acid-based polymer compound in an emulsion containing a (meth)acrylic resin particle obtained by polymerization in the absence of the polycarboxylic acid-based polymer compound, it is considered that the polycarboxylic acid-based polymer compound is used for stabilizing the synthesis of the (meth)acrylic resin particle, which is similar to micellar formation in an emulsifying agent, and the polycarboxylic acid-based polymer compound is therefore adsorbed efficiently onto the surface of the particle. It is considered that as a result, the (meth) acrylic resin particle having $D_A/D_B$ of less than 1 is made and the mechanical stability of the emulsion containing the (meth)acrylic resin particle and of the damping paint using the emulsion are made favorable.

As described above, the (meth)acrylic resin particle is preferably a (meth)acrylic resin particle obtained by polymerizing a monomer component containing 50% by mass or more of a (meth)acrylic acid ester in the presence of a particular amount of a polycarboxylic acid-based polymer compound, or may be a (meth)acrylic resin particle produced separately from a liquid medium contained in the resin emulsion. The resin emulsion can be obtained by subjecting the (meth)acrylic resin particle produced separately from the liquid medium contained in the resin emulsion to post-emulsification by a method such as forcible emulsification or self-emulsification. The above-described (meth)acrylic resin particle obtained by polymerizing a monomer component in a liquid medium in the presence of a particular amount of a polycarboxylic acid-based polymer compound is preferable from the viewpoint of productivity by which the (meth)acrylic resin particle dispersed in the liquid medium is easily obtained, and because it is considered that the polycarboxylic acid-based polymer compound is easily adsorbed. By using the (meth)acrylic resin particle, which is this polymerized product, an embodiment in which the (meth)acrylic resin particle is dispersed uniformly in the liquid medium is made possible and a resin emulsion having a more favorable mechanical stability and having more stable properties can be obtained.

As the (meth)acrylic resin particle obtained by polymerization in a liquid medium in the presence of a particular amount of a polycarboxylic acid-based polymer compound, specifically, a (meth)acrylic resin particle obtained by polymerization using a pre-emulsion containing a liquid medium, a monomer component, and a polycarboxylic acid-based polymer compound is preferable. An emulsion containing this polymerized product ((meth)acrylic resin particle) can be produced by, for example, dropping a pre-emulsion containing the liquid medium, the monomer component, and the polycarboxylic acid-based polymer compound, and a polymerization initiator into a liquid medium. The (meth)acrylic resin particle is preferably an emulsion-polymerized product using an aqueous medium as the liquid medium, and more preferably an emulsion-polymerized product using a pre-emulsion containing an aqueous medium, a monomer component, and a polycarboxylic acid-based polymer compound.

In addition, as the (meth)acrylic resin particle, a (meth) acrylic resin particle obtained by polymerization using a mixed liquid containing a liquid medium and a polycarboxylic acid-based polymer compound, and a pre-emulsion containing a liquid medium and a monomer component is also preferable. This polymerized product ((meth)acrylic resin particle) can be produced by, for example, dropping a pre-emulsion containing the liquid medium and the monomer component, and a polymerization initiator into the mixed liquid containing the liquid medium and the polycarboxylic acid-based polymer compound.

(Liquid Medium)

As the liquid medium, water is suitable from the viewpoint of safety in applying a damping paint using the resin emulsion and of an influence on environments, and an aqueous medium containing at least water can be used. As the aqueous medium, only water may be used, or a mixed solvent containing water and at least one of the solvents which are miscible with water may be used. As the liquid medium, water is preferably used as a main component, and it is preferable to use water in a proportion of 50% by mass or more based on the total mass of the liquid medium. Examples of the solvent which can be used for the mixed solvent include methanol, ethanol, isopropyl alcohol, ethyl carbitol, and N-methylpyrrolidone.

(Polycarboxylic Acid-Based Polymer Compound)

To form the adsorbed protective layer which is obtained by allowing a polycarboxylic acid-based polymer compound to be adsorbed onto the surface of a particle and which makes the above-described $D_A/D_B$ less than 1, 0.1 to 20 parts by mass of the polycarboxylic acid-based polymer compound based on 100 parts by mass of the total amount of the monomer component is preferably used when the (meth) acrylic resin particle is synthesized. The amount of the polycarboxylic acid-based polymer compound to be used is preferably 0.1 parts by mass or more, and more preferably 0.2 parts by mass or more from the viewpoint of obtaining the resin emulsion having a more favorable mechanical stability. On the other hand, from the viewpoint of suppressing swelling and peeling of a coating film and reducing production costs, the amount of the polycarboxylic acid-based polymer compound to be used is preferably 15 parts by mass or less, more preferably 12 parts by mass or less, and still more preferably 10 parts by mass or less.

The polycarboxylic acid-based polymer compound is a polymer compound having a structural unit derived from a carboxylic acid, or a salt or anhydride thereof. Examples of the carboxylic acid include (meth)acrylic acid, maleic acid, itaconic acid, and fumaric acid. The polycarboxylic acid-based polymer compound may be a homopolymer of one of a carboxylic acid, and a salt and an anhydride thereof (hereinafter, sometimes written as "carboxylic acid and the like") or may be a copolymer of two or more of a carboxylic acid, and a salt and an anhydride thereof. In addition, the polycarboxylic acid-based polymer compound may be a copolymer having a structural unit derived from at least one of the carboxylic acid and the like and a structural unit derived from at least one additional monomer. Examples of the additional monomer include: olefins such as ethylene and propylene; vinyl group-containing monomers such as styrene and vinyl acetate; sulfo group-containing monomers such as sulfonic acid and derivatives thereof; and amide group-containing monomers such as (meth)acrylamide.

The weight average molecular weight (Mw) of the polycarboxylic acid-based polymer compound is preferably 1,000 to 5,000,000 from the viewpoint of obtaining the resin emulsion having a favorable mechanical stability. From the viewpoint of dispersion stability of a filler in a damping paint obtained using the resin emulsion, the Mw of the polycarboxylic acid-based polymer compound is preferably 1,000 or more, more preferably 3,000 or more, and still more preferably 5,000 or more. On the other hand, from the viewpoint of suppressing an increase in the viscosity of the resin emulsion due to lowering of the solubility of the polycarboxylic acid-based polymer compound to the liquid medium (such as water) and suppressing deposition of the resin particle in the emulsion, the Mw of the polycarboxylic acid-based polymer compound is preferably 5,000,000 or less, more preferably 1,000,000 or less, and still more preferably 200,000 or less. In the present specification, the Mw of the polycarboxylic acid-based polymer compound is a value measured by gel permeation chromatography (GPC) using polyethylene glycol (PEG) as a standard substance.

Examples of the polycarboxylic acid-based polymer compound include poly(meth)acrylic acid, polymaleic acid, polyitaconic acid, acrylic acid-methacrylic acid copolymers, (meth)acrylic acid-maleic acid copolymers, olefin-maleic acid copolymers, (meth)acrylic acid-sulfonic acid copolymers, maleic anhydride-styrene copolymers, maleic anhydride-ethylene copolymers, maleic anhydride-vinyl acetate copolymers, and maleic anhydride-(meth)acrylic acid ester copolymers, and salts thereof, and at least one polycarboxylic acid-based polymer compound can be used. Examples of the salt include metal salts, ammonium salts, and organic amine salts. Examples of the metal atom in the metal salt include: alkali metals such as sodium and potassium; group 2 elements such as calcium and magnesium; and iron and aluminum. Examples of the organic amine salts include: alkylamine salts such as methylamine salts and ethylamine salts; and alkanolamine salts such as monoethanolamine salts, diethanolamine salts, and triethanolamine salts. As the polycarboxylic acid-based polymer compound, at least one selected from the group consisting of polycarboxylic acid type polymer surfactants, and polyacrylic acid and polyacrylic acid salts such as sodium polyacrylate is more preferably used.

Commercially available polycarboxylic acid-based polymer compounds can also be used. Examples of the commercially available products include trade names "DEMOL" series and "POIZ" series manufactured by Kao Corporation, trade name "AQUALIC" series manufactured by NIPPON SHOKUBAI CO., LTD., trade name "SHALLOL" series manufactured by DKS Co., Ltd., and trade name "JURYMER" series manufactured by TOAGOSEI CO., LTD.

(Monomer Component)

The monomer component for forming the (meth)acrylic resin particle may be a monomer component containing 50% by mass or more of a (meth)acrylic acid ester based on the total mass of the monomer component. As the monomer component, for example, (meth)acrylic acid besides the (meth)acrylic acid ester can also be used as a (meth)acrylic monomer. The (meth)acrylic resin particle is preferably a resin particle obtained by polymerizing a monomer component containing at least 50% by mass or more of the (meth)acrylic acid ester and preferably has 50% by mass or more of a structural unit derived from the (meth)acrylic acid ester. The (meth)acrylic resin particle may be a homopolymer of one (meth)acrylic acid ester or a copolymer of two or more (meth)acrylic acid esters. It is to be noted that the (meth)acrylic monomer means a monomer having a (meth) acryloyl group (acryloyl group or methacryloyl group).

Examples of the (meth)acrylic monomer include (meth) acrylic acid esters and (meth)acrylic acid and the like. The (meth)acrylic acid may be a salt. As the monomer component for forming the (meth)acrylic resin particle, at least one (meth)acrylic monomer can be used, and a (meth)acrylic acid ester and (meth)acrylic acid are preferably used. In the monomer component for constituting the (meth)acrylic resin particle, the content of the (meth)acrylic acid ester is 50% by mass or more (main component), more preferably 60% by mass or more, and still more preferably 70% by mass or more based on the total mass of the monomer component. It is to be noted that the content of the (meth)acrylic acid ester in the monomer component for constituting the (meth) acrylic resin particle refer to the total content of at least one (meth)acrylic acid ester in the monomer component.

((Meth)Acrylic Acid Ester)

Examples of the (meth)acrylic acid ester include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, n-amyl (meth)acrylate, isoamyl (meth)acrylate, hexyl (meth)acrylate, 2-ehtylhexyl (meth)acrylate, octyl (meth)acrylate, isooctyl (meth)acrylate, n-nonyl (meth)acrylate, isononyl (meth)acrylate, decyl (meth)acrylate, undecyl (meth)acrylate, dodecyl (meth)acrylate, tridecyl (meth)acrylate, tetradecyl (meth)acrylate, benzyl (meth)acrylate, cyclohexyl (meth)acrylate, stearyl (meth) acrylate, isobornyl (meth)acrylate, dicyclopentanyl (meth) acrylate, phenyl (meth)acrylate, 2-methoxyethyl (meth) acrylate, ethyl carbitol acrylate, β-carboxyethyl (meth) acrylate, 2-hydroxyethyl (meth)acrylate, 2-hydroxypropyl (meth)acrylate, ethylene glycol di(meth)acrylate, 1,4-butanediol di(meth)acrylate, 1,6-hexanediol di(meth)acrylate, diethylene glycol di(meth)acrylate, allyl (meth)acrylate, trimethylolpropane tri(meth)acrylate, 2-chloroethyl (meth) acrylate, trifluoroethyl (meth)acrylate, and perfluorooctylethyl (meth)acrylate. At least one of these (meth)acrylic acid esters can be used.

Among the above-described (meth)acrylic acid esters, an alkyl (meth)acrylate having an alkyl group which is optionally substituted with a hydroxy group, the alkyl group having 1 to 12 carbon atoms, is preferable. The alkyl group which is optionally substituted with a hydroxy group in the alkyl (meth)acrylate may be linear or branched, and the number of carbon atoms thereof is more preferably 1 to 8.

(Additional Monomer)

In addition, the (meth)acrylic resin particle may be a resin particle obtained by polymerizing a monomer component containing the above-described (meth)acrylic monomer and an additional monomer copolymerizable with the (meth) acrylic monomer. In this case, the (meth)acrylic resin particle can have a structural unit derived from the (meth) acrylic monomer and a structural unit derived from the additional monomer copolymerizable with the (meth)acrylic monomer.

Examples of the additional monomer copolymerizable with the (meth)acrylic monomer include: monomers each having a vinyl group, such as styrene, α-methylstyrene, vinyltoluene, ethylvinylbenzene, chlorostyrene, chloromethylstyrene, 4-hydroxystyrene, divinylbenzene, vinyl versatate, vinyl formate, vinyl acetate, vinyl propionate, vinyl chloride, and vinyl fluoride; monomers each having a carboxy group and an unsaturated bond, such as crotonic acid, itaconic acid, maleic acid, fumaric acid, citraconic acid, half esters of itaconic acid, half esters of maleic acid, maleic anhydride, and itaconic anhydride; and monomers each having a nitrogen atom and an unsaturated bond, such as acrylonitrile, methacrylonitrile, acrylamide, methacrylamide, diacetone acrylamide, N-methylolacrylamide, and N-methylolmethacrylamide. In the monomer component for forming the (meth)acrylic resin particle, at least one additional monomer copolymerizable with the (meth)acrylic monomer can be used.

Further, in the monomer for forming the (meth)acrylic resin particle, a monomer that can crosslink the resin particles can also be used. Examples of such a monomer include monomers each having two or more polymerizable double bonds, and at least one of them can be used. Examples of the monomers each having two or more polymerizable double bonds include divinyl benzene described above and diallyl phthalate in addition to the above-described methacrylic monomers each having two or more double bonds, such as ethylene glycol di(meth)acrylate, 1,4-butanediol di(meth) acrylate, 1,6-hexanediol di(meth)acrylate, diethylene glycol di(meth)acrylate, allyl (meth)acrylate, and trimethylolpropane tri(meth)acrylate.

The (meth)acrylic resin particle has at least a structural unit derived from a (meth)acrylic acid ester and is preferably a copolymer having a structural unit derived from a (meth) acrylic acid ester and a structural unit derived from (meth) acrylic acid. It is also preferable that the copolymer further have a structural unit derived from styrene.

The average particle diameter $D_B$ of the (meth)acrylic resin particle, obtained by a dynamic light scattering method, is not particularly limited but is preferably 25 to 1000 nm, more preferably 50 to 600 nm, and still more preferably 100 to 400 nm. The average particle diameter $D_A$ of the (meth)acrylic resin particle, obtained by a laser diffraction/scattering method, is preferably in the above-described range under the condition that the ratio of $D_A$ to $D_B$, $D_A/D_B$, is less than 1. In the present specification, the average particle diameter $D_A$ of the (meth)acrylic resin particle can be measured using a particle size distribution measurement apparatus utilizing a laser diffraction/scattering method. In addition, the average particle diameter $D_B$ of the (meth)acrylic resin particle can be measured using a particle size distribution measurement apparatus utilizing a dynamic light scattering method.

The glass transition temperature (Tg) of the (meth)acrylic resin particle is not particularly limited but is preferably −50 to 50° C., more preferably −30 to 30° C., and still more preferably −20 to 20° C. In the present specification, the Tg of the (meth)acrylic resin particle is a value obtained by DSC measurement in the case where the (meth)acrylic resin particle is a homopolymer. In addition, in the case where the (meth)acrylic resin particle is a copolymer, the Tg of the (meth)acrylic resin particle is a theoretical value determined from the following FOX equation using the Tg of the homopolymer.

$$1/Tg = W_1/Tg_1 + W_2/Tg_2 + \ldots W_n/Tg_n$$

In the above equation, Tg represents a glass transition temperature of a polymer (copolymer) of n types of monomer components (monomers 1 to n). $W_1$, $W_2$, ... $W_n$ each represent a mass fraction of each monomer (1, 2, ... n) based on the total amount of n types of monomer components, and $Tg_1$, $Tg_2$, ... $Tg_n$ each represent a glass transition temperature of a homopolymer of each monomer (1, 2, ... n). For example, when the monomers and the like used in Examples, which will be described later, are given as examples, the glass transition temperature of a homopolymer of each monomer is as follows. Those values are used for calculating the Tg of each (meth)acrylic resin particle produced in Examples, which will be described later.

Methyl methacrylate (MMA): 105° C.
Butyl acrylate (BA): −52° C.
2-Ethylhexyl acrylate (2EHA): −70° C.
Acrylic acid (AAc): 105° C.
Styrene (ST): 100° C.

The (meth)acrylic resin particle may be a particle having a core portion and a shell portion. When the (meth)acrylic resin particle takes such a form, the mechanical stability of the resin emulsion can be made more favorable, and by using the resin emulsion, a damping paint which can exhibit more excellent effects can be obtained. In the case where the (meth)acrylic resin particle has a core portion and a shell portion, the (meth)acrylic resin particle may have a uniform structure in which the core portion and the shell portion are completely compatible with each other and these cannot be distinguished or may have a core-shell composite structure or a microdomain structure in which these are not completely compatible with each other and are formed heterogeneously. To bring out the characteristics of the (meth)acrylic resin particle sufficiently and to prepare a stable (meth)acrylic resin particle, the core-shell composite structure is preferable among these structures. It is to be noted that the core-shell structure preferably takes a form such that the surface of the core portion is covered by the shell portion. In this case, it is suitable that the surface of the core portion is completely covered by the shell portion, but it is not necessary that the core portion is completely covered, and for example, the core-shell composite structure may take a form such that the surface of the core portion is covered in a mesh-like manner or a form such that the core portion is exposed in some parts thereof. In the case where the (meth)acrylic resin particle has a core portion and a shell portion, the polycarboxylic acid-based polymer compound may be used for the core portion or the shell portion, or for both of the core portion and the shell portion.

(Method for Producing Resin Emulsion)

A method for producing a resin emulsion for a damping paint according to one embodiment of the present invention comprises a step of polymerizing a monomer component containing 50% by mass or more of a (meth)acrylic acid ester in the presence of a polycarboxylic acid-based polymer compound to thereby form a particle obtained by polymerizing the monomer component and form an adsorbed protective layer obtained by allowing the polycarboxylic acid-based polymer compound to be adsorbed onto a surface of the particle, thereby synthesizing a (meth)acrylic resin particle having the previously described $D_A/D_B$ of less than 1.

As described above, the (meth)acrylic resin particle is preferably synthesized by polymerizing the monomer component in the presence of 0.1 to 20 parts by mass of the polycarboxylic acid-based polymer compound based on 100 parts by mass of the total amount of the monomer component for forming the resin particle. The (meth)acrylic resin particle is more preferably synthesized by polymerizing the monomer component in a liquid medium in the presence of 0.1 to 20 parts by mass (still more preferably 0.1 to 15 parts by mass) of the polycarboxylic acid-based polymer compound. Thereby, an emulsion containing, in the liquid medium, the (meth)acrylic resin particle in which the polycarboxylic acid-based polymer compound is adsorbed as an absorbed protective layer onto the surface of the particle can easily be produced.

As the method for producing the resin emulsion, a method of performing emulsion polymerization in the previously described aqueous medium in the presence of the monomer component and a particular amount of the polycarboxylic acid-based polymer compound is preferable because the method makes the adjustment of the particle diameter of the (meth)acrylic resin particle easy and is excellent in productivity. Specific examples of the emulsion polymerization method include the following method. That is, specific examples thereof include a method of mixing the aqueous medium, the monomer component, the polycarboxylic acid-based polymer compound, a polymerization initiator, and the like together to perform emulsion polymerization. In addition, specific examples thereof also include a method of performing emulsion polymerization using a pre-emulsion containing the aqueous medium, the monomer component, the polycarboxylic acid-based polymer compound, and the like. Further, specific examples thereof include a method of performing emulsion polymerization using: a mixed liquid containing the aqueous medium and the polycarboxylic acid-based polymer compound; and a pre-emulsion containing the aqueous medium and the monomer component.

More specifically, a method of synthesizing the (meth)acrylic resin particle in such a way that a pre-emulsion prepared by preliminarily mixing the aqueous medium, the monomer component, and the polycarboxylic acid-based polymer compound, and a polymerization initiator are separately dropped into the aqueous medium separately prepared to polymerize the monomer component in the aqueous medium is preferable. In addition, a method of synthesizing the (meth)acrylic resin particle in such a way that a pre-emulsion containing the aqueous medium and the monomer component, and a polymerization initiator are separately dropped into a mixed liquid containing the aqueous medium and the polycarboxylic acid-based polymer compound to polymerize the monomer component in the aqueous medium is also preferable. The method of synthesizing the (meth) acrylic resin particle is more preferably a method in which the pre-emulsion prepared by preliminarily mixing the aqueous medium, the monomer component, and the polycarboxylic acid-based polymer compound is used.

The polymerization conditions such as polymerization temperature and polymerization time, the types and the amounts of use of the polymerization initiator, the emulsifying agent, and the like to be used, etc. in synthesizing the (meth)acrylic resin particle can appropriately be determined within the same ranges as in the conventionally known emulsion polymerization.

For example, the polymerization conditions such as the polymerization temperature and the polymerization time can appropriately be determined according to the types of the monomer, the polycarboxylic acid-based polymer compound, the polymerization initiator, and the like to be used, the amount of use thereof, etc. For example, the polymerization temperature is preferably in a range of about 20 to about 100° C. and more preferably in a range of about 40 to about 90° C., and the polymerization time is preferably in a range of about 1 to about 15 hours. Further, the method of adding (dropping) the above-described pre-emulsion or polymerization initiator is not particularly limited, and for example, a batch addition method, a continuous addition method, a multistep addition, or the like can be adopted, and these addition methods may appropriately be combined.

Examples of the polymerization initiator include persulfates, organic peroxides, peroxides such as hydrogen peroxide, and azo compounds, and at least one polymerization initiator can be used. In addition, a redox polymerization initiator to be used together with a peroxide, and at least one reducing agent as a polymerization promotor can also be used.

Specific examples of the persulfates include potassium persulfate, sodium persulfate, and ammonium persulfate. Specific examples of the organic peroxides include: diacyl peroxides such as benzoyl peroxide and dilauroyl peroxide; dialkyl peroxides such as t-butyl cumyl peroxide and dicumyl peroxide; peroxy esters such as t-butyl peroxy laurate and t-butyl peroxy benzoate; and hydroperoxides such as cumene hydroperoxide and t-butyl hydroperoxide. Specific examples of the azo compounds include 2,2'-azobis (2-amidinopropane) dihydrochloride and 4,4'-azobis(4-cyanopentanoic acid). Specific examples of the reducing agent include ascorbic acid and salts thereof, tartaric acid and salts thereof, sulfurous acid and salts thereof, bisulfite and salts thereof, thiosulfuric acid and salts thereof, and iron (II) salts.

In synthesizing the (meth)acrylic resin particle, a known chain transfer agent may be used in order to adjust the molecular weight of the resin particle. As the chain transfer agent, for example, alkyl mercaptans such as hexyl mercaptan, lauryl mercaptan, octyl mercaptan, and n- or t-dodecyl mercaptan, and the like can be used.

In synthesizing the (meth)acrylic resin particle in the aqueous medium, an emulsifying agent (surfactant) can be used. Examples of the emulsifying agent include anionic surfactants, nonionic surfactants, cationic surfactants, and amphoteric surfactants, and at least one emulsifying agent can be used. As the emulsifying agent, an anionic surfactant and a nonionic surfactant is preferable, more preferably an anionic surfactant.

Examples of the anionic surfactants include: fatty acid salts such as sodium stearate; alkyl sulfate ester salts such as sodium lauryl sulfate; polyoxyalkylene alkyl ether sulfate ester salts such as sodium polyoxyethylene alkyl ether sulfates; alkylbenzene sulfonate salts such as sodium dodecylbenzene sulfonate; sodium dialkylsulfosuccinates; sodium alkyl diphenyl ether disulfonates; and reactive anionic surfactants such as ammonium polyoxyalkylene alkenyl ether sulfates. Examples of the nonionic surfactants include: polyoxyethylene alkyl ethers such as polyoxyethylene lauryl ether, polyoxyethylene stearyl ether, and polyoxyethylene oleyl ether; polyoxyalkylene derivatives such as polyoxyalkylene alkyl ethers; and reactive nonionic surfactants such as polyoxyalkylene alkenyl ethers.

In producing the resin emulsion, neutralization with a neutralizer is preferably performed after polymerizing the monomer component to obtain the (meth)acrylic resin particle. In the case where the (meth)acrylic resin particle has a carboxy group, the carboxy group is preferably neutralized with a basic neutralizer. The emulsion is stabilized by neutralization. The neutralizer is not particularly limited, and examples thereof include: alkali metal compounds such as sodium hydroxide and potassium hydroxide; alkali earth metal compounds such as calcium hydroxide and calcium carbonate; ammonia; and organic amines such as monomethylamine, dimethylamine, trimethylamine, monoethylamine, diethylamine, triethylamine, monoethanolamine, diethanolamine, triethanolamine, ethylenediamine, and diethylenetriamine, and at least one of these can be used.

The pH of the emulsion containing the above-described (meth)acrylic resin particle is not particularly limited but is preferably 6.0 to 10.0, more preferably 6.5 to 9.5, and still more preferably 7.0 to 9.0. In the present specification, as the pH of the resin emulsion, a value measured in accordance with the stipulation of JIS K6833-1:2008 can be adopted, and the pH of the emulsion is a value at 25° C.

The non-volatile content (solid content) of the resin emulsion is preferably 30 to 75% by mass, more preferably 40 to 70% by mass, and still more preferably 45 to 65% by mass based on the total mass of the resin emulsion. In the present specification, as the non-volatile content (solid content) of the resin emulsion, a value measured in accordance with the stipulation of JIS K6833-1:2008 can be adopted.

The viscosity of the resin emulsion at 25° C. is preferably 50 mPa·s or higher, more preferably 100 mPa·s or higher, and still more preferably 150 mPa·s or higher. In addition, from the viewpoint of handling, the viscosity of the resin emulsion at 25° C. is preferably 10,000 mPa·s or lower, more preferably 6000 mPa·s or lower, and still more preferably 4000 mPa·s or lower. In the present specification, as the viscosity of the resin emulsion at 25° C., a value measured in accordance with the stipulation of JIS K6833-1:2008 can be adopted.

It is to be noted that the resin emulsion can contain at least one resin particle corresponding to the previously described (meth)acrylic resin particle and may contain an additional resin particle other than the (meth)acrylic resin particle and various additives which can be blended in a damping paint, which will be described later.

The resin emulsion for a damping paint, described above in detail, contains the (meth)acrylic resin particle including the absorbed protective layer obtained by allowing the polycarboxylic acid-based polymer compound to be adsorbed onto the surface of the particle, wherein this (meth)acrylic resin particle has $D_A/D_B$ of less than 1, and therefore has a favorable mechanical stability. By using this resin emulsion, a damping paint which has a favorable mechanical stability and which can form a coating film (damping material) to which swelling and peeling are unlikely to occur can be provided. When swelling and peeling of the coating film is suppressed, the damping properties can be improved without impairing the appearance of the damping material, and in addition, a damping material which does not bring about adverse effects when another part is attached can be obtained.

By using the resin emulsion having a favorable mechanical stability in a damping paint, the damping paint also has a favorable mechanical stability, and therefore it is considered that clogging of a coating nozzle is unlikely to occur even when coating with the damping paint is performed continuously for a long time. Accordingly, the resin emulsion and the damping paint can contribute to improving coating workability, simplifying washing of a coating nozzle, improving productivity, and reducing costs due to suppression of clogging of the coating nozzle.

<Damping Paint>

A damping paint according to one embodiment of the present invention contains: the previously described resin emulsion for a damping paint; and a filler. The damping paint can be produced by blending the filler in the previously described resin emulsion. As the filler, at least one of inorganic fillers and organic fillers can be used, and among these, at least an inorganic filler is preferably used. Examples of the shape of the filler include a spherical shape, a polygonal shape, a flake-like shape, a plate-like shape, and a fiber-like shape. A filler having any of the shapes can be used for the damping paint, and fillers each having a different shape can be used in combination.

(Filler)

Examples of the inorganic filler include silica, calcium silicate, calcium carbonate, magnesium carbonate, aluminum oxide, iron oxide, titanium oxide, zinc oxide, aluminum hydroxide, magnesium hydroxide, zirconia, ferrite, carbon black, carbon fibers, glass flakes, glass fibers, barium sulfate, barium titanate, clay, diatomaceous earth, kaolin, halloysite, talc, mica, sericite, and smectite. As the organic filler, for example, a resin hollow particle and a foaming agent can suitably be used.

The total content of the filler in the damping paint is preferably 10 to 600 parts by mass based on 100 parts by mass of the (meth)acrylic resin particle (solid content) in the previously described emulsion. From the viewpoint of enhancing the damping properties of a coating film (damping material) formed by the damping paint, the content of the filler is preferably 10 parts by mass or more, more preferably 20 parts by mass or more, and still more preferably 50 parts by mass or more. On the other hand, from the viewpoint of making the adhesiveness between an object of imparting the damping properties and the coating film (damping material) formed by the damping paint favorable, the content of the filler is preferably 600 parts by mass or less, more preferably 550 parts by mass or less, and still more preferably 500 parts by mass or less.

(Additional Additives)

If necessary, the damping paint can contain various additives in addition to the previously described resin emulsion for a damping paint and the previously described filler. Examples of the additives which can be used for the damping paint include a coloring agent such as a pigment and a dye, a solvent, a plasticizer, a dispersant, a surfactant, a foaming agent, a lubricant, a gelling agent, a film-forming assistant, an antifreezing agent, a crosslinking agent, a pH modifier, a viscosity modifier, a preservative, an anti-mold agent, a germicide, an anti-corrosive agent, a flame retardant, a humectant, a defoaming agent, an anti-oxidizing agent, an anti-aging agent, an ultraviolet absorber, a stabilizer, an anti-static agent, and an anti-blocking agent.

The damping paint according to one embodiment of the present invention contains the previously described resin emulsion, and therefore a coating film (damping material) having enhanced damping properties can be formed. The damping properties of the coating film (damping material) formed by the damping paint can be evaluated by measuring the loss factor and a higher numerical value of the loss factor indicates that the damping paint has more excellent damping performance.

The temperature when the coating film (damping material) formed by the damping paint is used is often in a range of 20 to 60° C., and therefore the damping performance can be evaluated using the value of the loss factor at a predetermined temperature within the above-described temperature range. In addition, the damping performance of the damping material can also be evaluated using the total value of the loss factors at several predetermined temperatures within the above-described temperature range. For example, the total loss factor obtained by totaling the loss factors at 20° C., 30° C., 40° C., 50° C., and 60° C. (sum of loss factors at 5 points of respective temperatures) can be used for the evaluation of the damping performance. The coating film (damping material) formed by the damping paint preferably has the total loss factor of 0.500 or more, more preferably 0.520 or more, and still more preferably 0.550 or more, and particularly preferably 0.600 or more. In the present specification, the loss factor η refers to a value at a secondary resonance frequency, measured by a stationary excitation method in a cantilever system (one end fixing system) in accordance with the stipulation of JIS G0602: 1993, the value calculated by a half-power band width method.

The damping paint can be used for an object of imparting the damping properties. Examples of the object include: indoor floors and walls of vehicles such as an automobile, a railroad vehicle, a ship, and an airplane; home electric appliances such as a refrigerator, a washing machine, and a vacuum cleaner; and building structures and construction equipment. By applying the damping paint at the damping position in the object to form a coating film (damping material) formed by the damping paint, the damping paint can contribute to reduction in vibration and vibration sound in the object.

The method of applying the damping paint at the damping position in an object is not particularly limited, and a known coating method can appropriately be adopted as necessary. Examples of the suitable coating method include a coating method using an air spray nozzle and an extrusion coating method using a slit nozzle. Also, the amount of the damping paint to be applied on the object is not particularly limited, and, for example, the damping paint can be applied on the object so that the mass of the damping paint after drying is within a range of 1.0 to 10.0 kg/m$^2$. Also, the drying conditions after applying the damping paint are not particularly limited and can appropriately be set in consideration of the object, the coating film thickness, and the like. For example, the drying temperature can be set in a range of 60 to 200° C., and the drying time can be set in a range of 10 to 240 minutes. Furthermore, the thickness of the coating film (thickness of damping material) after drying, formed by the damping paint, is not particularly limited and is set, for example, in a range of 0.1 to 8 mm.

As described above, the resin emulsion for a damping paint, the damping paint, and the method for producing a resin emulsion for a damping paint, each being one embodiment of the present invention, can have the following constitution.

[1] A resin emulsion for a damping paint, containing a (meth)acrylic resin particle including: a particle obtained by polymerizing a monomer component containing 50% by mass or more of a (meth)acrylic acid ester; and an adsorbed protective layer obtained by allowing a polycarboxylic acid-based polymer compound having a structural unit derived from a carboxylic acid, or a salt or anhydride thereof to be adsorbed onto a surface of the particle, wherein the (meth)acrylic resin particle has a ratio of an average particle diameter $D_A$ by means of a laser diffraction/scattering method to an average particle diameter $D_B$ by means of a dynamic light scattering method, $D_A/D_B$, of less than 1.

[2] The resin emulsion for a damping paint according to [1], wherein the polycarboxylic acid-based polymer compound contains at least one selected from the group consisting of poly(meth)acrylic acid, polymaleic acid, polyitaconic acid, acrylic acid-methacrylic acid copolymers, (meth)acrylic acid-maleic acid copolymers, olefin-maleic acid copolymers, (meth)acrylic acid-sulfonic acid copolymers, maleic anhydride-styrene copolymers, maleic anhydride-ethylene copolymers, maleic anhydride-vinyl acetate copolymers, maleic anhydride-(meth)acrylic acid ester copolymers, and salts thereof, and polycarboxylic acid type polymer surfactants.

[3] The resin emulsion for a damping paint according to [1] or [2], wherein the polycarboxylic acid-based polymer compound contains at least one selected from the group consisting of polycarboxylic acid-type polymer surfactants, polyacrylic acid, and polyacrylic acid salts.

[4] The resin emulsion for a damping paint according to any one of [1] to [3], wherein the (meth)acrylic resin particle is a resin particle obtained by polymerizing the monomer component in the presence of 0.1 to 20 parts by mass of the polycarboxylic acid-based polymer compound based on 100 parts by mass of the total amount of the monomer component.

[5] The resin emulsion for a damping paint according to [4], wherein the (meth)acrylic resin particle is polymerized using a pre-emulsion containing a liquid medium, the monomer component, and the polycarboxylic acid-based polymer compound.

[6] The resin emulsion for a damping paint according to [4], wherein the (meth)acrylic resin particle is polymerized adding a pre-emulsion containing the liquid medium and the monomer component to a mixed liquid containing a liquid medium and the polycarboxylic acid-based polymer compound.

[7] The resin emulsion for a damping paint according to any one of [1] to [6], wherein the polycarboxylic acid-based polymer compound has a weight average molecular weight of 1,000 to 5,000,000.

[8] A damping paint containing: the resin emulsion according to any one of [1] to [7]; and a filler.

[9] A method for producing a resin emulsion for a damping paint, including polymerizing a monomer component containing 50% by mass or more of a (meth)acrylic acid ester in the presence of a polycarboxylic acid-based polymer compound having a structural unit derived from a carboxylic acid, or a salt or anhydride thereof to thereby form a particle obtained by polymerizing the monomer component and form an adsorbed protective layer obtained by allowing the polycarboxylic acid-based polymer compound to be adsorbed onto a surface of the particle, thereby synthesizing a (meth)acrylic resin particle having a ratio of an average particle diameter $D_A$ by means of a laser diffraction/scattering method to an average particle diameter $D_B$ by means of a dynamic light scattering method, $D_A/D_B$, of less than 1.

EXAMPLES

Hereinafter, further specific examples of the previously described embodiments will be described giving Examples and Comparative Examples, but the present invention is not limited to these Examples.

<Production of Resin Emulsions>

In the following Examples, resin emulsions each containing a (meth)acrylic resin particle including an adsorbed protective layer obtained by allowing a polycarboxylic acid-based polymer compound to be adsorbed onto the surface of the particle were produced using polycarboxylic acid-based polymer compounds (a) to (h) described in Table 1 below.

TABLE 1

Polycarboxylic acid-based polymer compounds (a) to (h) used

| | Trade name | Manufacturer | Active ingredient | Characteristics | Solid content (active ingredient) (% by mass) | Mw |
|---|---|---|---|---|---|---|
| (a) | DEMOL EP | Kao Corporation | Special polycarboxylic acid type polymer surfactant | Liquid | 25 | 7000 to 8000 |
| (b) | AQUALIC DL-40 | NIPPON SHOKUBAI CO., LTD. | Sodium polyacrylate | Liquid | 40 | 3500 |
| (c) | SHALLOL AN-103P | DKS Co., Ltd. | Sodium polyacrylate | Liquid | 44 | 10000 |
| (d) | AQUALIC HL-415 | NIPPON SHOKUBAI CO., LTD. | Polyacrylic acid | Liquid | 45 | 10000 |
| (e) | POIZ 520 | Kao Corporation | Sodium polyacrylate | Liquid | 40 | 25000 |
| (f) | AQUALIC DL-453 | NIPPON SHOKUBAI CO., LTD. | Sodium polyacrylate | Liquid | 35 | 50000 |
| (g) | JURYMER AC-10L | TOAGOSEI CO., LTD. | Polyacrylic acid | Liquid | 40 | 50000 |
| (h) | AQUALIC IH | NIPPON SHOKUBAI CO., LTD. | Sodium polyacrylate | Solid (granule) | 95 or more | 3 to 5 million |

Example A-1

In a four-neck separable flask equipped with a stirrer, a thermometer, a reflux condenser, and a dropping funnel, 193.3 parts by mass of deionized water was loaded, and the internal temperature was raised to 80° C. while the deionized water was stirring.

Apart from the separable flask, a monomer component (total amount of 540.7 parts by mass) containing 240.3 parts by mass of 2-ethylhexyl acrylate (2EHA), 293.7 parts by mass of methyl methacrylate (MMA), and 6.7 parts by mass of acrylic acid (AAc), and 4.0 parts by mass of t-dodecyl mercaptan, 5.6 parts by mass of a sodium polyoxyethylene alkyl ether sulfate (21.4 parts by mass of trade name "LATEMUL WX" (solid content of 26% by mass) manufactured by Kao Corporation) as an anionic emulsifier, 16.2 parts by mass of the polycarboxylic acid-based polymer compound (a) (64.9 parts by mass of trade name "DEMOL EP" manufactured by Kao Corporation), and 222.2 parts by mass of deionized water were emulsified with a homodisper to prepare a pre-emulsion.

Next, the prepared pre-emulsion was dropped uniformly from the dropping funnel into deionized water in the separable flask over 3 hours while the internal temperature in the separable flask was kept at 80° C., and simultaneously with this operation, 16.0 parts of a 10% by mass ammonium persulfate aqueous solution was dropped uniformly into deionized water in the separable flask over 3 hours. The resultant product was subjected to aging at 80° C. for 3 hours after completion of dropping and was then neutralized with 5.0 parts by mass of a 25% by mass ammonia water added after cooling. After the pH was adjusted, filtration was performed with 120-mesh filter cloth to obtain a (meth) acrylic resin emulsion 1 for a damping paint. In this way, a resin emulsion containing a (meth)acrylic resin particle obtained by polymerization in the presence of 3 parts by mass of the polycarboxylic acid-based polymer compound based on 100 parts by mass of the monomer component was produced. It is to be noted that the Tg (theoretical value) of the (meth)acrylic resin particle in this resin emulsion is 0° C.

Example A-2

A (meth)acrylic resin emulsion 2 for a damping paint was obtained in the same manner as in Example A-1 except that 16.2 parts by mass of the polycarboxylic acid-based polymer compound (a) used in Example A-1 was changed to 16.2 parts by mass of the polycarboxylic acid-based polymer compound (b) (40.6 parts by mass of trade name "AQUALIC DL-40" manufactured by NIPPON SHOKUBAI CO., LTD.).

Example A-3

A (meth)acrylic resin emulsion 3 for a damping paint was obtained in the same manner as in Example A-1 except that 16.2 parts by mass of the polycarboxylic acid-based polymer compound (a) used in Example A-1 was changed to 16.2 parts by mass of the polycarboxylic acid-based polymer compound (c) (36.9 parts by mass of trade name "SHALLOL AN-103P" manufactured by DKS Co., Ltd.).

Example A-4

A (meth)acrylic resin emulsion 4 for a damping paint was obtained in the same manner as in Example A-1 except that 16.2 parts by mass of the polycarboxylic acid-based polymer compound (a) used in Example A-1 was changed to 16.2 parts by mass of the polycarboxylic acid-based polymer compound (d) (36.0 parts by mass of trade name "AQUALIC HL-415" manufactured by NIPPON SHOKUBAI CO., LTD.).

Example A-5

A (meth)acrylic resin emulsion 5 for a damping paint was obtained in the same manner as in Example A-1 except that 16.2 parts by mass of the polycarboxylic acid-based polymer compound (a) used in Example A-1 was changed to 16.2 parts by mass of the polycarboxylic acid-based polymer compound (e) (40.6 parts by mass of trade name "POIZ 520" manufactured by Kao Corporation).

Example A-6

A (meth)acrylic resin emulsion 6 for a damping paint was obtained in the same manner as in Example A-1 except that 16.2 parts by mass of the polycarboxylic acid-based polymer compound (a) used in Example A-1 was changed to 16.2 parts by mass of the polycarboxylic acid-based polymer compound (f) (46.3 parts by mass of trade name "AQUALIC DL-453" manufactured by NIPPON SHOKUBAI CO., LTD.).

Example A-7

A (meth)acrylic resin emulsion 7 for a damping paint was obtained in the same manner as in Example A-1 except that 16.2 parts by mass of the polycarboxylic acid-based polymer compound (a) used in Example A-1 was changed to 16.2 parts by mass of the polycarboxylic acid-based polymer compound (g) (40.6 parts by mass of trade name "JURYMER AC-10L" manufactured by TOAGOSEI CO., LTD.).

Example A-8

A (meth)acrylic resin emulsion 8 for a damping paint was obtained in the same manner as in Example A-1 except that 16.2 parts by mass of the polycarboxylic acid-based polymer compound (a) used in Example A-1 was changed to 5.4 parts by mass of the polycarboxylic acid-based polymer compound (h) (5.7 parts by mass of trade name "AQUALIC IH" manufactured by NIPPON SHOKUBAI CO., LTD.). In this way, in Example A-8, a resin emulsion containing a (meth) acrylic resin particle obtained by polymerization in the presence of 1 part by mass of the polycarboxylic acid-based polymer compound based on 100 parts by mass of the monomer component was produced.

Example A-9

A (meth)acrylic resin emulsion 9 for a damping paint was obtained in the same manner as in Example A-1 except that 16.2 parts by mass of the polycarboxylic acid-based polymer compound (a) used in Example A-1 was changed to 1.1 parts by mass of the polycarboxylic acid-based polymer compound (a) (4.3 parts by mass of trade name "DEMOL EP" manufactured by Kao Corporation), and the monomer component (total amount of 540.7 parts by mass) used in Example A-1 was changed to a monomer component (total amount of 540.7 parts by mass) containing 108.1 parts by mass of styrene (ST), 289.9 parts by mass of butyl acrylate (BA), 136.0 parts by mass of methyl methacrylate (MMA), and 6.7 parts by mass of acrylic acid (AAc). In this way, in Example A-9, a resin emulsion containing a (meth)acrylic resin particle obtained by polymerization in the presence of 0.2 parts by mass of the polycarboxylic acid-based polymer compound based on 100 parts by mass of the monomer component was produced. It is to be noted that the Tg (theoretical value) of the (meth)acrylic resin particle in this resin emulsion is 0° C.

Example A-10

A (meth)acrylic resin emulsion 10 for a damping paint was obtained in the same manner as in Example A-1 except that 16.2 parts by mass of the polycarboxylic acid-based polymer compound (a) used in Example A-1 was changed to 2.7 parts by mass of the polycarboxylic acid-based polymer compound (a) (10.8 parts by mass of trade name "DEMOL EP" manufactured by Kao Corporation), and the monomer component (total amount of 540.7 parts by mass) used in Example A-1 was changed to a monomer component (total amount of 540.7 parts by mass) containing 108.1 parts by mass of styrene (ST), 290.1 parts by mass of 2-ethylhexyl acrylate (2EHA), 135.8 parts by mass of methyl methacrylate (MMA), and 6.7 parts by mass of acrylic acid (AAc). In this way, in Example A-10, a resin emulsion containing a (meth)acrylic resin particle obtained by polymerization in the presence of 0.5 parts by mass of the polycarboxylic acid-based polymer compound based on 100 parts by mass of the monomer component was produced. It is to be noted that the Tg (theoretical value) of the (meth)acrylic resin particle in this resin emulsion is −15° C.

Example A-11

A (meth)acrylic resin emulsion 11 for a damping paint was obtained in the same manner as in Example A-1 except that 16.2 parts by mass of the polycarboxylic acid-based polymer compound (a) used in Example A-1 was changed to 27.0 parts by mass of the polycarboxylic acid-based polymer compound (a) (108.1 parts by mass of trade name "DEMOL EP" manufactured by Kao Corporation), and the monomer component (total amount of 540.7 parts by mass) used in Example A-1 was changed to a monomer component (total amount of 540.7 parts by mass) containing 108.1 parts by mass of styrene (ST), 106.5 parts by mass of butyl acrylate (BA), 106.5 parts by mass of 2-ethylhexyl acrylate (2EHA), 212.9 parts by mass of methyl methacrylate (MMA), and 6.7 parts by mass of acrylic acid (AAc). In this way, in Example A-11, a resin emulsion containing a (meth)acrylic resin particle obtained by polymerization in the presence of 5 parts by mass of the polycarboxylic acid-based polymer compound based on 100 parts by mass of the monomer component was produced. It is to be noted that the Tg (theoretical value) of the (meth)acrylic resin particle in this resin emulsion is 15° C.

Example A-12

A (meth)acrylic resin emulsion 12 for a damping paint was obtained in the same manner as in Example A-1 except that 16.2 parts by mass of the polycarboxylic acid-based polymer compound (a) used in Example A-1 was changed to 54.1 parts by mass of the polycarboxylic acid-based polymer compound (a) (216.3 parts by mass of trade name "DEMOL EP" manufactured by Kao Corporation), and the monomer component (total amount of 540.7 parts by mass) was changed to a monomer component (total amount of 540.7 parts by mass) containing 274.4 parts by mass of 2-ethylhexyl acrylate (2EHA), 259.6 parts by mass of methyl methacrylate (MMA), and 6.7 parts by mass of acrylic acid (AAc). In this way, in Example A-12, a resin emulsion containing a (meth)acrylic resin particle obtained by polymerization in the presence of 10 parts by mass of the polycarboxylic acid-based polymer compound based on 100 parts by mass of the monomer component was produced. It is to be noted that the Tg (theoretical value) of the (meth)acrylic resin particle in this resin emulsion is −10° C.

Example A-13

A (meth)acrylic resin emulsion 13 for a damping paint was obtained in the same manner as in Example A-1 except that 16.2 parts by mass of the polycarboxylic acid-based polymer compound (a) used in Example A-1 was changed to 64.9 parts by mass of the polycarboxylic acid-based polymer compound (a) (259.5 parts by mass of trade name "DEMOL EP" manufactured by Kao Corporation), and the monomer component (total amount of 540.7 parts by mass) was changed to a monomer component (total amount of 540.7 parts by mass) containing 225.7 parts by mass of 2-ethylhexyl acrylate (2EHA), 308.3 parts by mass of methyl methacrylate (MMA), and 6.7 parts by mass of acrylic acid (AAc). In this way, in Example A-13, a resin emulsion containing a (meth)acrylic resin particle obtained by polymerization in the presence of 12 parts by mass of the polycarboxylic acid-based polymer compound based on 100 parts by mass of the monomer component was produced. It is to be noted that the Tg (theoretical value) of the (meth)acrylic resin particle in this resin emulsion is 5° C.

Example A-14

A (meth)acrylic resin emulsion 14 for a damping paint was obtained in the same manner as in Example A-1 except that 16.2 parts by mass of the polycarboxylic acid-based polymer compound (a) used in Example A-1 was changed to 81.1 parts by mass of the polycarboxylic acid-based polymer compound (a) (324.4 parts by mass of trade name "DEMOL EP" manufactured by Kao Corporation), and the monomer component (total amount of 540.7 parts by mass) was changed to a monomer component (total amount of 540.7 parts by mass) containing 257.7 parts by mass of 2-ethylhexyl acrylate (2EHA), 276.3 parts by mass of methyl methacrylate (MMA), and 6.7 parts by mass of acrylic acid (AAc). In this way, in Example A-14, a resin emulsion containing a (meth)acrylic resin particle obtained by polymerization in the presence of 15 parts by mass of the polycarboxylic acid-based polymer compound based on 100 parts by mass of the monomer component was produced. It is to be noted that the Tg (theoretical value) of the (meth)acrylic resin particle in this resin emulsion is −5° C.

Example A-15

A (meth)acrylic resin emulsion 15 for a damping paint was obtained in the same manner as in Example A-1 except that in the four-neck separable flask in which 193.3 parts by mass of deionized water was loaded in Example A-1, 16.2 parts by mass of the polycarboxylic acid-based polymer compound (a) (64.9 parts by mass of trade name "DEMOL EP" manufactured by Kao Corporation) was further loaded, but instead, the polycarboxylic acid-based polymer compound was not used in the pre-emulsion. In this way, in Example A-15, a resin emulsion containing a (meth)acrylic resin particle obtained by polymerization in the presence of 3 parts by mass of the polycarboxylic acid-based polymer compound based on 100 parts by mass of the monomer component was produced.

Example A-16

A (meth)acrylic resin emulsion 16 for a damping paint was obtained in the same manner as in Example A-1 except that in the four-neck separable flask in which 193.3 parts by mass of deionized water was loaded in Example A-1, 54.1 parts by mass of the polycarboxylic acid-based polymer compound (a) (216.3 parts by mass of trade name "DEMOL EP" manufactured by Kao Corporation) was further loaded, but instead, the polycarboxylic acid-based polymer compound was not used in the pre-emulsion. In this way, in Example A-16, a resin emulsion containing a (meth)acrylic resin particle obtained by polymerization in the presence of 10 parts by mass of the polycarboxylic acid-based polymer compound based on 100 parts by mass of the monomer component was produced.

Comparative Example A-17

A (meth)acrylic resin emulsion 17 for a damping paint was obtained in the same manner as in Example A-1 except that the polycarboxylic acid-based polymer compound used in Example A-1 was not used. In this way, in Comparative Example A-17, a (meth)acrylic resin emulsion obtained by polymerization in the absence of the polycarboxylic acid-based polymer compound was produced.

Comparative Example A-18

A (meth)acrylic resin emulsion 18 for a damping paint was obtained in the same manner as in Example A-1 except that 16.2 parts by mass of the polycarboxylic acid-based polymer compound (a) used in Example A-1 was changed to 0.3 parts by mass of the polycarboxylic acid-based polymer compound (a) (1.1 parts by mass of trade name "DEMOL EP" manufactured by Kao Corporation). In this way, in Comparative Example A-18, a resin emulsion containing a (meth)acrylic resin particle obtained by polymerization in the presence of 0.05 parts by mass of the polycarboxylic acid-based polymer compound based on 100 parts by mass of the monomer component was produced.

Comparative Example A-19

Firstly, a resin emulsion which is the same as the one in Comparative Example A-17 was prepared. That is, a (meth)acrylic resin particle was synthesized and a resin emulsion was produced in the same manner as in Example A-1 except that the polycarboxylic acid-based polymer compound used in Example A-1 was not used. Subsequently, to the obtained resin emulsion, 16.2 parts by mass of the polycarboxylic acid-based polymer compound (a) (64.9 parts by mass of trade name "DEMOL EP" manufactured by Kao Corporation) was added and blended. In this way, in Comparative Example A-19, a (meth)acrylic resin emulsion obtained by polymerization in the absence of the polycarboxylic acid-based polymer compound was produced, and thereafter 3 parts by mass of the polycarboxylic acid-based polymer compound based on 100 parts by mass of the monomer component was added to the resin emulsion to produce the resin emulsion 19.

Comparative Example A-20

A resin emulsion 20 was obtained in the same manner as in Comparative Example A-19 except that 16.2 parts by mass of the polycarboxylic acid-based polymer compound (a) used in Comparative Example A-19 was changed to 54.1 parts by mass of the polycarboxylic acid-based polymer compound (a) (216.3 parts by mass of trade name "DEMOL EP" manufactured by Kao Corporation). In this way, in Comparative Example A-20, a (meth)acrylic resin emulsion obtained by polymerization in the absence of the polycarboxylic acid-based polymer compound was produced, and thereafter 10 parts by mass of the polycarboxylic acid-based polymer compound based on 100 parts by mass of the monomer component was added to the resin emulsion to produce the resin emulsion 20.

Comparative Example A-21

An emulsion containing a polymer particle was synthesized along the description of Example 8 in Japanese Patent Laid-Open No. 2011-26528. Specifically, the emulsion was obtained by multistage polymerization using, as a monomer component, 55 parts by mass of styrene, 43 parts by mass of butyl acrylate, and 2 parts by mass of acrylic acid, and, as an emulsifying agent, 2 parts by mass of polyoxyethylene distyrenated cresol ammonium sulfate (trade name "Newcol 707SF", manufactured by NIPPON NYUKAZAI CO., LTD.) and 4 parts by mass in total of a polyoxyethylene oleyl ether and a special polycarboxylic acid type polymer surfactant (2 parts by mass of trade name "EMULGEN 420" and 5 parts by mass of trade name "POIZ 520" (40% by mass aqueous solution) each manufactured by Kao Corporation). The multistage polymerization was performed through a general emulsion polymerization method in which the monomer component was divided into three equal parts, 0.1 parts by mass of ammonium persulfate based on the total mass of the monomer component was added as a polymerization initiator to the monomer component for the first stage, 0.2 parts by mass of ammonium persulfate based on the total mass of the monomer component was added as a polymerization initiator to the monomer component for the second stage, and 0.3 parts by mass of ammonium persulfate based on the total mass of the monomer component was added as a polymerization initiator to the monomer component for the third stage. Next, 0.2 parts by mass of polyoxyethylene distyrenated phenyl ether (0.1 parts by mass of trade name "EMULGEN A90" and 0.1 parts by mass of trade name "EMULGEN A500" each manufactured by Kao Corporation) was added to and mixed with the emulsion after the polymerization.

With respect to the emulsion thus obtained, the average particle diameter $D_A$ by means of a laser diffraction/scattering method and the average particle diameter $D_B$ by means of a dynamic light scattering method were measured at 23° C. by the same method as the measurement method which will be described later after the concentration of the emulsion was adjusted so that the absorbance fell within a proper range in the case of the measurement of the average particle diameter $D_A$ by means of a laser/diffraction method, and the concentration of the emulsion was adjusted so that the scattering intensity (quantity of light) fell within a proper range in the case of the measurement of the average particle diameter $D_B$ by means of a dynamic light scattering method. As a result, the average particle diameter $D_A$ was found to be 265 nm, the average particle diameter $D_B$ was found to be 232 nm, and $D_A/D_B$ was found to be 1.14.

<Characteristics of Resin Emulsion>

With respect to each obtained emulsion, the average particle diameter $D_A$ by means of a laser diffraction/scattering method and the average particle diameter $D_B$ by means of a dynamic light scattering method of the (meth)acrylic resin particle in the resin emulsion, and the pH, non-volatile content, and viscosity of the resin emulsion were measured as follows.

(Average Particle Diameter $D_A$ of Resin Particles by Means of Laser Diffraction/Scattering Method)

The particle diameter ($D_{50}$) at which cumulation reaches 50% in the particle size distribution on a volume basis when the refractive index is 1.45-0.5i was measured for resin particles in each resin emulsion using a particle size distribution measurement apparatus (trade name "Laser Diffraction Type Nano Particle Size Distribution Measurement Apparatus SALD-7100" manufactured by SHIMADZU CORPORATION) utilizing a laser diffraction/scattering method.

(Average Particle Diameter $D_B$ of Resin Particles by Means of Dynamic Light Scattering Method)

The particle diameter ($D_{50}$) at which cumulation reaches 50% in the particle size distribution on a volume basis was measured for resin particles in each resin emulsion using a particle size distribution measurement apparatus (trade name "Particle Size Analyzer for Concentrated Systems FPAR-1000" manufactured by Otsuka Electronics Co., Ltd.) utilizing a dynamic light scattering method.

(pH of Resin Emulsion)

The pH of each resin emulsion at 25° C. was measured using a pH meter (trade name "pH Meter HM-25R" manufactured by DKK-TOA CORPORATION) in accordance with the stipulation of JIS K6833-1:2008.

(Non-Volatile Content of Resin Emulsion)

The non-volatile content (solid content) of each emulsion was measured in accordance with the stipulation of JIS K6833-1:2008 under conditions of a drying temperature of 140° C. and a drying time of 0.5 hours.

(Viscosity of Resin Emulsion)

The viscosity of each emulsion was measured using a BH type rotary viscometer (BHII Viscometer manufactured by Toki Sangyo Co., Ltd.) in accordance with the stipulation of JIS K6833-1:2008 under conditions of a revolution speed of 10 rpm and a temperature of 25° C.

(Mechanical Stability of Resin Emulsion)

To 100 g of each resin emulsion, 50 g of pure water was added and a resultant mixture was stirred and mixed sufficiently, followed by filtration with 300-mesh wire netting, and thereafter a mechanical stability test was performed using 100 g of the filtrate and a Maron stability tester (manufactured by JIMQUARTZ Corporation). The test conditions were such that the scale of the platform scale was set to 10 kg, the number of revolutions of the disk was set to 1000 rpm, the revolution time was set to 10 minutes, and the test temperature was set to 25° C., which are in accordance with JIS K6828:1996. Immediately after the test was completed, aggregates were subjected to filtration with 300-mesh wire netting and dried at 110° C. for 1 hour to measure the mass of the residue of the aggregates after drying. The aggregation rate was calculated according to the following equation.

Aggregation rate (%)=(mass g of residue of aggregates after drying/100 g)×100

The mechanical stability of each emulsion was evaluated according to the following evaluation criteria using the aggregation rate calculated as described above.

A: Aggregation rate is lower than 0.001%.

B: Aggregation rate is 0.001% or higher and lower than 0.005%.

C: Aggregation rate is 0.005% or higher and lower than 0.01%.

D: Aggregation rate is 0.01% or higher.

With respect to each of the above resin emulsions 1 to 20, the types and amounts of monomers and polycarboxylic acid-based polymer compounds used for producing the resin particles, and $D_A/D_B$ of the resin particles, the characteristics of the resin emulsions, and the evaluation results of the mechanical stability of the resin emulsions are shown in Table 2-1 to Table 2-3.

TABLE 2-1

Amounts of use of main raw materials (units: parts by mass), characteristics, and evaluation results of resin emulsions

| | | Example A-Resin emulsion | | | | | | | |
|---|---|---|---|---|---|---|---|---|---|
| | | 1 | 2 | 3 | 4 | 5 | 6 | 7 | 8 |
| Monomer Component | ST | | | | | | | | |
| | BA | | | | | | | | |
| | 2EHA | 240.3 | 240.3 | 240.3 | 240.3 | 240.3 | 240.3 | 240.3 | 240.3 |
| | MMA | 293.7 | 293.7 | 293.7 | 293.7 | 293.7 | 293.7 | 293.7 | 293.7 |
| | AAc | 6.7 | 6.7 | 6.7 | 6.7 | 6.7 | 6.7 | 6.7 | 6.7 |
| Polycarboxylic acid-based polymer (*) | (a) | 16.2 | | | | | | | |
| | (b) | | 16.2 | | | | | | |
| | (c) | | | 16.2 | | | | | |
| | (d) | | | | 16.2 | | | | |
| | (e) | | | | | 16.2 | | | |
| | (f) | | | | | | 16.2 | | |
| | (g) | | | | | | | 16.2 | |
| | (h) | | | | | | | | 5.4 |
| Tg (° C., theoretical value) | | 0 | 0 | 0 | 0 | 0 | 0 | 0 | 0 |
| Average particle diameter $D_A$ (nm) | | 165 | 195 | 130 | 185 | 165 | 160 | 125 | 175 |
| Average particle diameter $D_B$ (nm) | | 220 | 250 | 180 | 260 | 240 | 250 | 200 | 220 |
| $D_A/D_B$ | | 0.75 | 0.78 | 0.72 | 0.71 | 0.69 | 0.64 | 0.63 | 0.80 |
| pH | | 7.8 | 8.1 | 8.0 | 7.6 | 8.3 | 8.4 | 7.7 | 8.0 |
| Solid content (% by mass) | | 55.0 | 55.0 | 55.0 | 55.0 | 55.0 | 55.0 | 55.0 | 55.0 |
| Viscosity (mPa · s) | | 600 | 480 | 680 | 700 | 800 | 1050 | 1200 | 950 |
| Mechanical stability | Aggregation rate (%) | 0.0002 | 0.0006 | 0.0003 | 0.0002 | 0.0003 | 0.0003 | 0.0002 | 0.0009 |
| | Evaluation | A | A | A | A | A | A | A | A |

(*) In Examples A-1 to 8, polycarboxylic acid-based polymer was used together with monomer component and emulsifier in pre-emulsion.

TABLE 2-2

Amounts of use of main raw materials (units: parts by mass), characteristics, and evaluation results of resin emulsions

| | | Example A-Resin emulsion | | | | | | | |
|---|---|---|---|---|---|---|---|---|---|
| | | 9 | 10 | 11 | 12 | 13 | 14 | 15 | 16 |
| Monomer component | ST | 108.1 | 108.1 | 108.1 | | | | | |
| | BA | 289.9 | | 106.5 | | | | | |
| | 2EHA | | 290.1 | 106.5 | 274.4 | 225.7 | 257.7 | 240.3 | 240.3 |
| | MMA | 136.0 | 135.8 | 212.9 | 259.6 | 308.3 | 276.3 | 293.7 | 293.7 |
| | AAc | 6.7 | 6.7 | 6.7 | 6.7 | 6.7 | 6.7 | 6.7 | 6.7 |
| Polycarboxylic acid-based polymer (*) | (a) | 1.1 | 2.7 | 27.0 | 54.1 | 64.9 | 81.1 | 16.2 (Initial loading) | 54.1 (Initial loading) |
| Tg (° C., theoretical value) | | 0 | −15 | 15 | −10 | 5 | −5 | 0 | 0 |
| Average particle diameter $D_A$ (nm) | | 290 | 260 | 170 | 130 | 115 | 110 | 170 | 155 |
| Average particle diameter $D_B$ (nm) | | 300 | 280 | 250 | 240 | 230 | 250 | 210 | 230 |
| $D_A/D_B$ | | 0.97 | 0.93 | 0.68 | 0.54 | 0.50 | 0.44 | 0.81 | 0.67 |
| pH | | 8.1 | 7.9 | 8.4 | 7.6 | 8.3 | 8.0 | 8.2 | 8.4 |
| Solid content (% by mass) | | 55.0 | 55.0 | 55.0 | 55.0 | 55.0 | 55.0 | 55.0 | 55.0 |
| Viscosity (mPa · s) | | 300 | 400 | 2100 | 3850 | 5500 | 8650 | 700 | 2200 |
| Mechanical stability | Aggregation rate (%) | 0.0008 | 0.0006 | 0.0002 | 0.0002 | 0.0002 | 0.0003 | 0.0007 | 0.0005 |
| | Evaluation | A | A | A | A | A | A | A | A |

(*) In Examples A-9 to 14, polycarboxylic acid-based polymer was used together with monomer component and emulsifier in pre-emulsion.
(*) In Examples A-15 and 16, polycarboxylic acid-based polymer was used by being loaded in water into which monomer component was dropped.

TABLE 2-3

Amounts of use of main raw materials (units: parts by mass), characteristics, and evaluation results of resin emulsions

| | | Comparative Example A-Resin emulsion | | | |
|---|---|---|---|---|---|
| | | 17 | 18 | 19 | 20 |
| Monomer component | ST | | | | |
| | BA | | | | |
| | 2EHA | 240.3 | 240.3 | 240.3 | 240.3 |
| | MMA | 293.7 | 293.7 | 293.7 | 293.7 |
| | AAc | 6.7 | 6.7 | 6.7 | 6.7 |
| Polycarboxylic acid-based polymer (*) | (a) | | 0.3 | 16.2 (Blend) | 54.1 (Blend) |
| Tg (° C., theoretical value) | | 0 | 0 | 0 | 0 |
| Average particle diameter $D_A$ (nm) | | 195 | 200 | 170 | 210 |
| Average particle diameter $D_B$ (nm) | | 185 | 195 | 165 | 200 |
| $D_A/D_B$ | | 1.05 | 1.03 | 1.03 | 1.05 |
| pH | | 8.0 | 8.3 | 7.6 | 7.8 |
| Solid content (% by mass) | | 55.0 | 55.0 | 55.0 | 55.0 |
| Viscosity (mPa · s) | | 200 | 220 | 300 | 450 |
| Mechanical stability | Aggregation rate (%) | 0.133 | 0.016 | 0.023 | 0.008 |
| | Evaluation | D | D | D | C |

(*) In Comparative Example A-18, polycarboxylic acid-based polymer was used together with monomer component and emulsifier in pre-emulsion.
(*) In Comparative Examples A-19 and 20, polycarboxylic acid-based polymer was used by being blended in resin emulsion after synthesizing resin particle.

<Preparation of Damping Paints>

Example B-1

181.8 g of the resin emulsion (100 g of solid because solid content thereof is 55%) obtained in Example A-1, 1.0 g of a dispersant (trade name "SMA 1440H" manufactured by KAWAHARA PETROCHEMICAL CO., LTD.), 0.5 g of a defoaming agent (trade name: NOPCO 8034 manufactured by SAN NOPCO LIMITED), 200.0 g of calcium carbonate, and 54.0 g of mica were added, and a resultant mixture was mixed using a high-speed stirrer. Subsequently, a slight amount of an alkaline thickener was added to obtain a paint having a viscosity of 25 Pa·s and a P. W. C (Pigment Weight Concentration) of 72%. A damping paint 1 was obtained by deaerating this paint using a vacuum agitation deaerator. It is to be noted that the deaeration was performed under conditions of a degree of vacuum of 10 mmHg (Torr) or 1333 Pa for 5 minutes, and the same applies to the following examples.

Examples B-2 to 16

In Examples B-2 to B-16, damping paints 2 to 16 were obtained in the same manner as in Example B-1 except that the resin emulsion 1 used in Example B-1 was changed to the resin emulsions 2 to 16 respectively.

Comparative Examples B-17 to 20

In Comparative Examples B-17 to B-20, damping paints 17 to 20 were obtained in the same manner as in Example B-1 except that the resin emulsion 1 used in Example B-1 was changed to the resin emulsions 17 to 20 respectively.

<Mechanical Stability of Damping Paints>
(Measurement Method)

To 100 g of each damping paint, 50 g of pure water was added, and a resultant mixture was stirred and mixed sufficiently, followed by filtration with 300-mesh wire netting, and thereafter a mechanical stability test was performed using 100 g of the filtrate and a Maron stability tester (manufactured by JIMQUARTZ Corporation). The test conditions were such that the scale of the platform scale was set to 10 kg, the number of revolutions of the disk was set to 1000 rpm, the revolution time was set to 10 minutes, and the test temperature was set to 25° C., which are in accordance with JIS K6828:1996. Immediately after the test was completed, aggregates were subjected to filtration with 300-mesh wire netting and dried at 110° C. for 1 hour to measure the mass of the residue of the aggregates after drying. The aggregation rate was calculated according to the following equation.

Aggregation rate (%)=(mass g of residue of aggregates after drying/100 g)×100

The mechanical stability of each damping paint was evaluated according to the following evaluation criteria using the aggregation rate calculated as described above.

A: Aggregation rate is lower than 0.005%.
B: Aggregation rate is 0.005% or higher and lower than 0.01%.
C: Aggregation rate is 0.01% or higher and lower than 0.05%.
D: Aggregation rate is 0.05% or higher and lower than 0.10.
E: Aggregation rate is 0.1% or higher.

<Swelling and Peeling of Coating Film>

Each of the damping paints obtained in the above Examples B-1 to 16 and Comparative Examples B-17 to 20 was applied on a base material (70 mm in width×150 mm in length×0.8 mm in thickness) of SPCC-SD (dull steel sheet: manufactured by Nippon Testpanel Co., Ltd.) so that the dried-film thickness was 1.5 mm, and the applied damping paint was dried at 160° C. for 30 minutes to forma coating film. The surface of the coating film after drying was observed visually, and the occurrence of swelling and peeling was evaluated according to the following evaluation criteria.

(Criteria for Evaluating Swelling)

A: Swelling is not ascertained in the whole surface of the coating film.
B: Swelling with a diameter of about 2 to about 3 mm is ascertained at 1 to 4 points in the whole surface of the coating film.
C: Swelling with a diameter of about 4 to about 10 mm is ascertained at 1 to 2 points in the whole surface of the coating film.
D: Swelling with a diameter of about 2 to about 3 mm is ascertained at 5 or more points in the whole surface of the coating film.
E: Swelling with a diameter of about 4 to about 10 mm is ascertained at 3 or more points in the whole surface of the coating film.
F: Swelling is ascertained over the whole surface of the coating film.

(Criteria for Evaluating Peeling)

Good: Peeling is not ascertained at the surface of the coating film.

Poor: Peeling is ascertained at the surface of the coating film.

<Damping Properties>

Test pieces were prepared under the conditions in accordance with the testing system of Japan Automobile Research Institute, a general incorporated foundation, in order to evaluate the damping performance of each damping paint, and the loss factor η was measured by a cantilever method. The operating temperature is herein assumed to be 20 to 60° C., and the loss factor η at each temperature of 20° C., 30° C., 40° C., 50° C., and 60° C. was measured to evaluate the damping properties by the total loss factor (total value of 5 points) obtained by summing up those values. When the value of this total loss factor is larger, it can be decided that the damping paint has more favorable damping properties.

The loss factor η was specifically measured in the following manner. Each damping paint was applied on a 200 mm×10 mm×1.6 mm test piece made of a steel sheet so that the amount after drying was about 4.0 kg/m$^2$, and the applied damping paint was dried at 100° C. for 2 hours to form a coating film (damping material), thereby preparing a test piece. A plurality of test pieces were prepared for each paint, and those without foaming, a pinhole, or a crack were selected from among the test pieces and used for the evaluation of the damping properties. The loss factor η at each temperature of 20° C., 30° C., 40° C., 50° C., and 60° C. was measured for each test piece for evaluation using a system for measuring complex modulus of elasticity (MS18143-NT) manufactured by B&K (Brüel & Kjær Sound & Vibration Measurement A/S) under the measurement conditions in accordance with JIS G0602 "Test methods for vibration-damping property in laminated damping steel sheets of constrained type". As the resonance frequency in this measurement, a secondary resonance frequency that makes measurement precision high was adopted, and the values of η at the secondary resonance frequency were used. It is to be noted that the loss factor η could not be measured in Comparative Examples B-17 and 3-18 because the coating film dropped out from the test piece.

The number of the resin emulsion used, the evaluation results of the mechanical stability, the evaluation results of swelling and peeling of the coating film, and the evaluation results of the damping properties for the above damping paints 1 to 20 are shown in Tables 3-1 to 3-3.

TABLE 3-1

Resin emulsions (number in Table 2-1) used for damping paints and evaluation results of damping paints

| | | Example B-Damping paint | | | | | | | |
|---|---|---|---|---|---|---|---|---|---|
| | | 1 | 2 | 3 | 4 | 5 | 6 | 7 | 8 |
| | | Resin emulsion used | | | | | | | |
| | | 1 | 2 | 3 | 4 | 5 | 6 | 7 | 8 |
| Mechanical stability | Aggregation rate (%) | 0.0012 | 0.0025 | 0.0027 | 0.0024 | 0.0017 | 0.0016 | 0.0014 | 0.0031 |
| | Evaluation | A | A | A | A | A | A | A | A |
| Swelling of coating film | | A | B | B | B | A | A | A | B |
| Peeling of coating film | | Good | Good | Good | Good | Good | Good | Good | Good |
| Loss factor η | 20° C. | 0.188 | 0.175 | 0.180 | 0.185 | 0.190 | 0.170 | 0.165 | 0.161 |
| | 30° C. | 0.209 | 0.211 | 0.205 | 0.210 | 0.216 | 0.200 | 0.202 | 0.199 |
| | 40° C. | 0.139 | 0.138 | 0.140 | 0.135 | 0.131 | 0.140 | 0.138 | 0.132 |
| | 50° C. | 0.070 | 0.072 | 0.074 | 0.072 | 0.069 | 0.060 | 0.070 | 0.065 |
| | 60° C. | 0.045 | 0.032 | 0.043 | 0.039 | 0.041 | 0.035 | 0.041 | 0.039 |
| | Total value of 5 points | 0.651 | 0.628 | 0.642 | 0.641 | 0.647 | 0.605 | 0.616 | 0.596 |

TABLE 3-2

Resin emulsions (number in Table 2-2) used for damping paints and evaluation results of damping paints

| | | Example B-Damping paint | | | | | | | |
|---|---|---|---|---|---|---|---|---|---|
| | | 9 | 10 | 11 | 12 | 13 | 14 | 15 | 16 |
| | | | | | Resin emulsion used | | | | |
| | | 9 | 10 | 11 | 12 | 13 | 14 | 15 | 16 |
| Mechanical stability | Aggregation rate (%) | 0.0015 | 0.0013 | 0.0014 | 0.0029 | 0.0043 | 0.0009 | 0.0012 | 0.0013 |
| | Evaluation | A | A | A | A | A | A | A | A |
| Swelling of coating film | | A | A | A | B | B | A | B | A |
| Peeling of coating film | | Good | Good | Good | Good | Good | Good | Good | Good |
| Loss factor η | 20° C. | 0.183 | 0.205 | 0.142 | 0.200 | 0.165 | 0.196 | 0.158 | 0.155 |
| | 30° C. | 0.198 | 0.171 | 0.168 | 0.182 | 0.188 | 0.189 | 0.200 | 0.201 |
| | 40° C. | 0.135 | 0.115 | 0.180 | 0.128 | 0.148 | 0.131 | 0.125 | 0.126 |
| | 50° C. | 0.071 | 0.048 | 0.109 | 0.052 | 0.088 | 0.060 | 0.060 | 0.055 |
| | 60° C. | 0.044 | 0.020 | 0.080 | 0.024 | 0.060 | 0.031 | 0.042 | 0.032 |
| | Total value of 5 points | 0.631 | 0.559 | 0.679 | 0.586 | 0.649 | 0.607 | 0.585 | 0.569 |

TABLE 3-3

Resin emulsions (number in Table 2-3) used for damping paints and evaluation results of damping paints

| | | Comparative Example B-Damping paint | | | |
|---|---|---|---|---|---|
| | | 17 | 18 | 19 | 20 |
| | | | Resin emulsion used | | |
| | | 17 | 18 | 19 | 20 |
| Mechanical stability | Aggregation rate (%) | 0.4285 | 0.3502 | 0.1523 | 0.0724 |
| | Evaluation | E | E | E | D |
| Swelling of coating film | | F | F | D | E |
| Peeling of coating film | | Poor | Poor | Good | Good |
| Loss factor η | 20° C. | — | — | 0.123 | 0.149 |
| | 30° C. | — | — | 0.182 | 0.187 |
| | 40° C. | — | — | 0.098 | 0.104 |
| | 50° C. | — | — | 0.045 | 0.049 |
| | 60° C. | — | — | 0.022 | 0.028 |
| | Total of 5 points | — | — | 0.470 | 0.517 |

As can be seen from the results of the above Examples and Comparative Examples, it was ascertained that the resin emulsion containing the (meth)acrylic resin particle including the adsorbed protective layer obtained by allowing the polycarboxylic acid-based compound to be adsorbed onto the surface of the particle and having $D_A/D_B$ of less than 1 has a favorable mechanical stability. It was also ascertained that by using this resin emulsion, a damping paint that can form a coating film (damping material) which has favorable damping properties and to which swelling and peeling are unlikely to occur can be provided.

The invention claimed is:

1. A resin emulsion for a damping paint, comprising a (meth)acrylic resin particle including:
a particle obtained by polymerizing a monomer component containing 50% by mass or more of a (meth)acrylic acid ester; and
an adsorbed protective layer obtained by allowing a polycarboxylic acid-based polymer compound having a structural unit derived from a carboxylic acid, or a salt or anhydride thereof to be adsorbed onto a surface of the particle, wherein
the (meth)acrylic resin particle has a ratio of an average particle diameter $D_A$ by means of a laser diffraction/scattering method to an average particle diameter $D_B$ by means of a dynamic light scattering method, $D_A/D_B$, of less than 1,
wherein the (meth)acrylic resin particle is a resin particle obtained by polymerizing the monomer component in the presence of 0.1-20 parts by mass of the polycarboxylic acid-based polymer compound based on 100 parts by mass of the total amount of the monomer component.

2. The resin emulsion for a damping paint according to claim 1, wherein the polycarboxylic acid-based polymer compound contains at least one selected from the group consisting of poly(meth)acrylic acid, polymaleic acid, polyitaconic acid, acrylic acid-methacrylic acid copolymers, (meth)acrylic acid-maleic acid copolymers, olefin-maleic acid copolymers, (meth)acrylic acid-sulfonic acid copolymers, maleic anhydride-styrene copolymers, maleic anhydride-ethylene copolymers, maleic anhydride-vinyl acetate copolymers, maleic anhydride-(meth)acrylic acid ester copolymers, and salts thereof, and polycarboxylic acid polymer surfactants.

3. The resin emulsion for a damping paint according to claim 1, wherein the polycarboxylic acid-based polymer compound contains at least one selected from the group consisting of polycarboxylic acid polymer surfactants, polyacrylic acid, and polyacrylic acid salts.

4. The resin emulsion for a damping paint according to claim 1, wherein the (meth)acrylic resin particle is polymerized using a pre-emulsion containing a liquid medium, the monomer component, and the polycarboxylic acid-based polymer compound.

5. The resin emulsion for a damping paint according to claim 1, wherein the (meth)acrylic resin particle is polymerized adding a pre-emulsion containing the liquid medium and the monomer component to a mixed liquid containing a liquid medium and the polycarboxylic acid-based polymer compound.

6. The resin emulsion for a damping paint according to claim 1, wherein the polycarboxylic acid-based polymer compound has a weight average molecular weight of 1,000 to 5,000,000.

7. A damping paint comprising: the resin emulsion for a damping paint according to claim 1; and a filler.

8. A method for producing the resin emulsion for a damping paint according to claim 1, the method comprising
polymerizing the monomer component containing 50% by mass or more of a (meth)acrylic acid ester in the presence of the polycarboxylic acid-based polymer compound having a structural unit derived from a carboxylic acid, or a salt or anhydride thereof to thereby form a particle obtained by polymerizing the monomer component and form an adsorbed protective layer obtained by allowing the polycarboxylic acid-based polymer compound to be adsorbed onto a surface of the particle, thereby synthesizing the (meth)acrylic resin particle having a ratio of an average particle diameter $D_A$ by means of a laser diffraction/scattering method to an average particle diameter $D_B$ by means of a dynamic light scattering method, $D_A/D_B$, of less than 1.

* * * * *